UNITED STATES PATENT OFFICE.

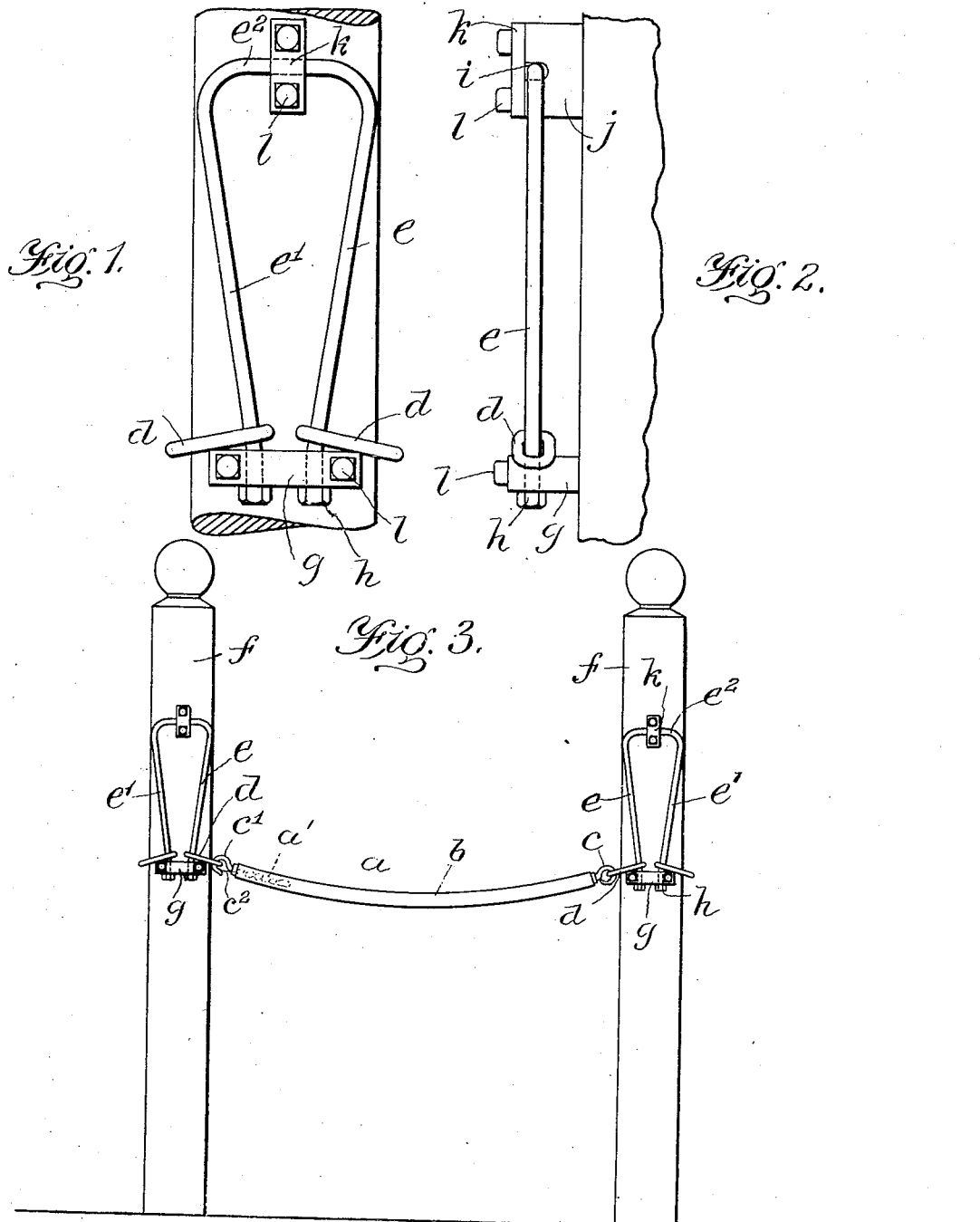

EVERETT C. PYNE, OF LYNN, MASSACHUSETTS.

STALL-GUARD.

No. 826,113.  Specification of Letters Patent.  Patented July 17, 1906.

Application filed October 12, 1905. Serial No. 282,378.

*To all whom it may concern:*

Be it known that I, EVERETT C. PYNE, of Lynn, in the county of Essex and State of Massachusetts, have invented certain new and useful Improvements in Stall-Guards, of which the following is a specification.

The object of the present invention is to provide a novel guard for stalls and an attachment for holding the ends of the guard across the stall which will prevent a horse or other animal confined in the stall from becoming injured in case it should attempt to rise after having lain down and backed partially out beneath the guard and which will also be entirely effective to keep the animal in the stall.

It has been common hitherto to pass a rope or chain across the rear end of a stall, attaching its ends to rings or staples fixed in the stall-partition, the ends of the rope or chain being thereby held without possibility of moving up or down.

By my invention I provide a novel device to which the ends of the stall-guard may be attached, which will permit the same to rise and fall and will provide a greater amount of slack in the guard when it is elevated than when lowered.

Another object is to provide a novel guard having flexibility, weight, and a yielding protective covering.

The invention consists in the device described in the following specification and illustrated in the drawings, in which—

Figure 1 represents an elevation of a holder or attachment embodying the present invention. Fig. 2 represents a side view of the same. Fig. 3 represents in elevation a view of the rear end of a stall having my novel guard attached thereto.

The same reference characters indicate the same parts in all the figures.

$a$ represents a flexible guard member which is adapted to extend across the rear portion of a stall for confining a horse or other animal therein. This guard member consists of a chain $a'$, which provides the flexibility and weight necessary for the purposes of my invention, and is surrounded throughout the greater portion of its length by a covering $b$ of a yielding and flexible material, such as rubber. The rubber covering may conveniently be made by taking a section of hose or tubing and passing the chain through the same. The ends of the chain are provided with hooks $c$ and $c'$, respectively, which are engaged with rings $d$, slidingly mounted upon travelers. The hook $c$ is carried about its ring sufficiently far to prevent detachment, while the hook $c'$ is provided with a tongue $c^2$, of any form suitable for a snap-hook, which permits it to be engaged with and removed from its traveler-ring and prevents accidental disengagement.

The travelers with which the rings $d$ are engaged each consist of a rod or bar $e$, preferably mounted upon the rear side of the partition between adjacent stalls or on the post $f$, which forms the end of such partition. The traveler-rods instead of being vertical are inclined and converge upwardly, so that the upper portions of the two rods with which any one guard member $a$ is engaged are nearer together than are the lower portions of such rods. Thereby when the guard member $a$ is elevated its ends are nearer together, and it has a greater amount of slack than when it hangs from the lower ends of the travelers.

Preferably a single attachment constitutes the travelers for two adjacent stalls and is made from a length of rod bent into the general form of an inverted U or of a horseshoe, the upper portion of the device being of greater width than the lower part. There are thus formed two straight side sections $e$ $e'$, respectively, which are inclined with respect to each other and converge downwardly when the device is attached in place, and a transverse connecting-section $e^2$ at the top. The ends of the rod are secured to a block $g$, preferably by being passed through holes drilled therein and secured by nuts $h$, threaded upon the projecting ends. The intermediate part $e^2$ passes through a hole or slot $i$ in a second block $j$ and is retained therein by engagement with the sides of the slot and also by a strap $k$, extending across the slot. Both the blocks $g$ and $j$ are secured to the end of a stall-partition by bolts or screws $l$, so that the widest portion of the device is uppermost and thereby the adjacent straight portions $e$ of devices on adjacent stall-partitions are inclined toward each other and upwardly, as previously described.

By reason of the construction and arrangement described an animal confined within the stall is enabled to rise without impediment, when, as occasionally happens, it has moved backward while lying down, so that the guard member $a$ extends across its back. As the horse rises the guard is carried upward, the rings to which the ends of the guard are attached moving along the traveler-rods, and at the same time as the horse moves forward the guard by reason of its greater slackness and of its weight is enabled to slide from the animal's back and drop into normal position. Thus it is impossible for the guard to prevent the animal from rising or to cause it to become strained and injured in trying to rise. The animal also will be unable to back out under the guard after having risen, for the reason that the guard will always fall into normal position in the manner above described.

By constructing the guard from a metallic chain the necessary weight and flexibility is given for the purposes described, while the rubber covering protects the hind legs of the animal from being cut or chafed by the metal and also prevents its tail becoming caught between the links.

I claim—

1. A guard for stalls comprising in combination traveler-rods fixed to the opposite walls of the stall and inclined upwardly toward each other, and a flexible guard slidingly engaged with the rods and extending across the stall.

2. A stall-guard attachment consisting of a rod having the general shape of an inverted U with the top of greater width than the bottom, and means for attaching the same to the wall of a stall.

3. A stall-guard attachment consisting of a rod bent to form an intermediate transverse portion, and substantially straight sides inclined toward each other.

4. A stall-guard attachment consisting of a rod bent to form an intermediate transverse portion and having inclined sides, an anchoring-block embracing the transverse portion and adapted to be secured to a stall, and a second anchoring-block engaged with the ends of the rod and also adapted to be secured to a stall.

5. A stall-guard attachment consisting of a rod bent to form an intermediate transverse portion and having inclined sides, an anchoring-block connected to the transverse portion, a second block having perforations through which the ends of the bars are passed, both of said blocks being adapted for attachment to the wall of a stall, and means for retaining the ends of the rod in connection with the second block.

6. A stall-guard attachment consisting of a rod bent to form an intermediate transverse portion and substantially straight sides inclined toward each other, a block surrounding said intermediate portion, and a second block secured to the ends of said straight sides, said blocks being adapted for attachment to the wall of a stall.

In testimony whereof I have affixed my signature in presence of two witnesses.

EVERETT C. PYNE.

Witnesses:
ARTHUR H. BROWN
A. C. RATIGAN.